(12) United States Patent
Pasquini et al.

(10) Patent No.: US 10,032,230 B2
(45) Date of Patent: Jul. 24, 2018

(54) AUDITING SYSTEM WITH HISTORIC SALE DEVIATION DATABASE

(71) Applicant: Amadeus S.A.S., Sophia Antipolis (FR)

(72) Inventors: Ilaria Pasquini, Vallauris-Golfe Juan (FR); Simon Cognet, Antibes (FR); Anais Sandamiani, Nice (FR); Mehdi Lefouili, Cambridge, MA (US); Matteo Aragone, Genoa (IT)

(73) Assignee: AMADEUS S.A.S., Biot (FR)

( * ) Notice: Subject to any disclaimer, the term of this patent is extended or adjusted under 35 U.S.C. 154(b) by 322 days.

(21) Appl. No.: 14/457,462

(22) Filed: Aug. 12, 2014

(65) Prior Publication Data

US 2016/0048926 A1    Feb. 18, 2016

(51) Int. Cl.
*G07B 17/00*  (2006.01)
*G06Q 40/00*  (2012.01)

(52) U.S. Cl.
CPC ................... *G06Q 40/12* (2013.12)

(58) Field of Classification Search
None
See application file for complete search history.

(56) References Cited

U.S. PATENT DOCUMENTS

| | | |
|---|---|---|
| 6,959,287 B2 | 10/2005 | Rabideau et al. |
| 7,146,002 B1 | 12/2006 | Smith et al. |
| 7,447,646 B1 | 11/2008 | Agarwal et al. |
| 7,940,899 B2 | 5/2011 | Moorman, III et al. |
| 7,970,701 B2 | 6/2011 | Lewis et al. |
| 7,979,459 B2 | 7/2011 | Wu et al. |
| 7,983,452 B2 | 7/2011 | Chaney et al. |
| 8,027,439 B2 | 9/2011 | Zoldi et al. |
| 8,065,233 B2 | 11/2011 | Lee et al. |
| 2002/0010664 A1 | 1/2002 | Rabideau et al. |
| 2002/0188733 A1 | 12/2002 | Collins et al. |
| 2004/0088204 A1 | 5/2004 | Plum et al. |
| 2004/0230472 A1 | 11/2004 | Venkat et al. |
| 2005/0043961 A1 | 2/2005 | Torres et al. |

(Continued)

OTHER PUBLICATIONS

USPTO, Office Action issued in U.S. Appl. No. 14/187,755 dated Jan. 8, 2015.

(Continued)

*Primary Examiner* — Paul Danneman
(74) *Attorney, Agent, or Firm* — Thompson Hine LLP (57) ABSTRACT

Methods, systems, and computer program products for auditing of transactions involving the sale of travel services by an indirect seller. An auditing module receives data defining a transaction proposed by the indirect seller. The module compares a quoted price for the transaction to a correct price for the transaction to determine if there is a pricing discrepancy. If a discrepancy exists, the module classifies the transaction and searches a business rules database maintained by a travel service provider for business rules relevant to the classification. The audit module further queries a historical sales deviation database to retrieve seller history data, and selects the relevant business rule having the best match to the seller history data. The audit module then determines whether to allow or block the transaction, issue a warning, or suggest an Agency Debit Memo based on an action defined by the business rule having the best match.

24 Claims, 4 Drawing Sheets

(56) References Cited

U.S. PATENT DOCUMENTS

| | | | |
|---|---|---|---|
| 2005/0144098 A1 | 6/2005 | Vance et al. | |
| 2006/0200456 A1 | 9/2006 | Zohar et al. | |
| 2006/0229958 A1 | 10/2006 | Sergio et al. | |
| 2008/0046334 A1 | 2/2008 | Lee et al. | |
| 2008/0086409 A1 | 4/2008 | Moorman et al. | |
| 2008/0140576 A1 | 6/2008 | Lewis et al. | |
| 2008/0302870 A1 | 12/2008 | Berini et al. | |
| 2009/0052751 A1 | 2/2009 | Chaney et al. | |
| 2009/0063219 A1 | 3/2009 | Raufaste et al. | |
| 2009/0106170 A1* | 4/2009 | Thurlow | G06Q 10/10 705/400 |
| 2009/0216568 A1 | 8/2009 | Raufaste et al. | |
| 2011/0080344 A1 | 4/2011 | Dura et al. | |
| 2011/0082781 A1 | 4/2011 | Hu et al. | |
| 2011/0295704 A1 | 12/2011 | Edwards | |
| 2012/0101937 A1* | 4/2012 | Zoldi | G06Q 10/10 705/38 |
| 2012/0128240 A1 | 5/2012 | Rothschild | |
| 2012/0239442 A1 | 9/2012 | Mortagne et al. | |
| 2012/0316981 A1 | 12/2012 | Hoover et al. | |
| 2013/0138517 A1 | 5/2013 | Khan et al. | |
| 2013/0151344 A1 | 6/2013 | Tavares et al. | |
| 2013/0253965 A1 | 9/2013 | Joseph | |
| 2013/0282583 A1* | 10/2013 | Siddens | G06Q 20/405 705/44 |
| 2013/0311230 A1 | 11/2013 | Kellstrand et al. | |
| 2014/0067435 A1 | 3/2014 | Hasnas et al. | |

OTHER PUBLICATIONS

US, Non-Final Office Action; U.S. Appl. No. 13/180,319; (dated Mar. 2, 2016).

US, Non-Final Office Action; U.S. Appl. No. 14/117,993; (dated Mar. 9, 2016).

US, Non-Final Office Action; U.S. Appl. No. 14/325,847; (dated Mar. 11, 2016).

US, Non-Final Office Action; U.S. Appl. No. 14/187,698; (dated Mar. 16, 2016).

U.S. Patent and Trademark Office, Office Action issued in related U.S. Appl. No. 14/025,054 dated Apr. 29, 2016.

USPTO, Office Action issued in U.S. Appl. No. 13/926,136 dated Jun. 3, 2016.

USPTO, Office Action issued in U.S. Appl. No. 13/926,136 dated Apr. 27, 2015.

USPTO, final Office Action issued in U.S. Appl. No. 14/187,755 dated May 1, 2015.

Canis, U.S. Appl. No. 13/926,136, filed Jun. 25, 2013 entitled Optimizing Generation of Debit Memos Agency.

Clark, "Scheduling Dependent Real-Time Activities" Thesis submitted to Carnegie Mellon University, Copyright 1990.

Ravindran et al., "Adaptive Time-Critical Resource Management Using Time/Utility Functions", SIGOPS Europe 2004.

European Patent Office, Extended European Search Report issued in application No. 14290050.5 dated May 16, 2014.

Canis, U.S. Appl. No. 14/025,054, filed Sep. 12, 2013 entitled Auditing Rules Optimizer.

U.S. Patent and Trademark Office, Office Action issued in related U.S. Appl. No. 13/926,136 dated Oct. 22, 2015, 13 pages.

U.S. Patent and Trademark Office, Office Action issued in related U.S. Appl. No. 14/025,054 dated Jan. 5, 2016.

Scott Zare, Final Office Action issued in related U.S. Appl. No. 14/187,755 dated Jul. 21, 2015, 11 pages.

Laure Canis, U.S. Appl. No. 14/187,698, filed Feb. 24, 2014 entitled Automatic Auditing System Including Agency Debit Memo Generation.

Laure Canis, U.S. Appl. No. 14/325,847, filed Jul. 8, 2014 entitled Preventive Auditing.

Laure Canis, U.S. Appl. No. 14/636,602, filed Mar. 3, 2015 entitled Prioritizing Transactions in a Transaction Queue.

Laure Canis, U.S. Appl. No. 14/619,301, filed Feb. 11, 2015 entitled Using Management to Improve Payment Fraud.

Laure Canis, U.S. Appl. No. 14/187,755, filed Feb. 24, 2014 entitled Auditing System with Increased Accuracy.

Office Action issued in U.S. Appl. No. 14/636,602 dated Aug. 10, 2017.

USPTO, Office Action issued in U.S. Appl. No. 14/619,301 dated Feb. 23, 2018.

IP Australia, Patent Examination Report No. 1 issued in corresponding Application No. 2014224081 dated Sep. 9, 2015, 5 pages.

* cited by examiner

| | DATE (74a) | SIGN (74b) | OFFICE (74c) | DISCREPANCY RANGE (74d) | FARE CATEGORY VIOLATED (74e) | ... | TAX VIOLATION (74m) |
|---|---|---|---|---|---|---|---|
| 72a | 12/01/2014 | 1234AA | NCE1A0901 | -10.20 USD | CAT 31 | ... | NO |
| 72b | 12/01/2014 | 1234AA | NCE1A0901 | -5.50 USD | NO | ... | YES |
| 72c | 12/01/2014 | 1234AA | NCE1A0911 | -8.00 USD | CAT 01 | ... | NO |
| ... | ... | ... | ... | ... | ... | ... | ... |
| 72n | 12/01/2014 | 1234AA | NCE1A0901 | -8.00 USD | CAT 31 | ... | NO |

FIG. 5

| | DISCREPANCY RANGE (84a) | TRANSACTION (84b) | FARE CATEGORY VIOLATED (84c) | TAX VIOLATION (84d) | CHECK LEVEL (84e) | CHECK PERIOD (84f) | CUMULATIVE FRAUD (84g) | FREQUENCY OF FRAUD (84h) | ... | ACTION (84m) |
|---|---|---|---|---|---|---|---|---|---|---|
| 82a | > 10.00 USD | ISSUANCE | CAT 31 | * | AGENT | 1 MONTH | < 10000.00 USD | < 10 | ... | ACCEPT |
| 82b | > 10.00 USD | ISSUANCE | CAT 31 | * | AGENT | 1 MONTH | < 10000.00 USD | > 10 | ... | REJECT |
| 82c | * | * | * | * | OFFICE | 1 WEEK | > 10000.00 USD | > 9 | ... | WARNING |
| ... | ... | ... | ... | ... | ... | ... | ... | ... | ... | ... |
| 82n | < 10.00 USD | REFUND | CAT 31 | * | CORPORATE | 1 MONTH | > 10000.00 USD | > 400 | ... | REJECT |

FIG. 6

AUDITING SYSTEM WITH HISTORIC SALE DEVIATION DATABASE

BACKGROUND

The invention generally relates to computers and computer software, and in particular to methods, systems, and computer program products for auditing transactions associated with the sale of travel services.

In the travel industry, airline tickets are often sold through an indirect seller, such as an online travel agency or a validating carrier. The indirect seller will typically check for available flights that satisfy a traveler's itinerary and, once matching flights are found, book the flights for the traveler. As part of this booking process, the indirect seller may collect payment from the traveler for the tickets. To cover the operating carrier's charges for providing transportation services, the indirect seller provides a portion of the collected payment to the operating carrier.

To ensure that indirect sellers are selling tickets in compliance with restrictions and rules relating to pricing of the ticket, these transactions may occasionally be audited. An audit may verify whether the amounts of the fare, taxes, and commission match the restrictions and rules in place regarding the details of the ticket sold. Because of the magnitude of annual worldwide revenue generated by the airline industry, correcting even small discrepancies across all tickets sold could result in a significant recovery of otherwise lost revenue.

If an audit indicates that the indirect seller has not properly charged for a ticket, the auditing carrier may attempt to recover the discrepancy by issuing an Agency Debit Memo (ADM). However, generating and issuing an ADM can add significant management costs to the transaction. For this reason, carriers may accept small errors in pricing rather than issue an ADM to recover the discrepancy. Thus, the cost of issuing the ADM may provide an opportunity for indirect sellers to consistently price tickets slightly below the correct price without incurring a penalty. In other cases, indirect sellers may unknowingly violate a pricing rule of the carrier for modifications made to a ticket in good-faith, causing the carrier to issue an ADM that could have otherwise been avoided.

Thus, carriers and indirect sellers have a need for improved systems, methods, and computer program products for auditing transactions, reducing the number of ADMs, and recovering discrepancies to reduce costs associated with incorrect pricing of travel services.

SUMMARY

In an embodiment of the invention, a method of managing a transaction by a seller of a travel service is provided. The method includes receiving data characterizing the transaction and including a first price for a travel service to be provided by a service provider. The method further includes determining a second price for the travel service based on a pricing rule of the service provider, and determining if the first price matches the second price. In response to the first price matching the second price, the method allows the transaction, and in response to the first price not matching the second price, the method determines an action based on a set of transactions that occurred prior to the transaction.

In another embodiment of the invention, an apparatus is provided that includes a processor and a memory. The memory includes program code that, when executed by the processor, causes the apparatus to receive the data characterizing the transaction and including the first price for the travel service to be provided by the service provider. The program code further causes the apparatus to determine the second price for the travel service based on the pricing rule of the service provider, and determine if the first price matches the second price. In response to the first price matching the second price, the program codes causes the apparatus to allow the transaction, and in response to the first price not matching the second price, the program code causes the apparatus to determine the action based on the set of transactions that occurred prior to the transaction.

In another embodiment of the invention, a computer program product is provided that includes a non-transitory computer-readable storage medium including program code. The program code is configured, when executed by a processor, to cause the processor to receive the data characterizing the transaction and including the first price for the travel service to be provided by the service provider. The program code further causes the processor to determine the second price for the travel service based on the pricing rule of the service provider, and to determine if the first price matches the second price. In response to the first price matching the second price, the program codes causes the processor to allow the transaction, and in response to the first price not matching the second price, the program code causes the processor to determine the action based on the set of transactions that occurred prior to the transaction.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Embodiments of the invention may be implemented by a processing and database system, such as a Global Distribution System (GDS). The processing and database system may facilitate interconnections between indirect sellers of airline tickets and a plurality of computer reservation systems each associated with a travel service provider. In the context of air travel, the processing and database system may be configured to allow travelers to book airline tickets and other travel services through indirect sales channels. These indirect sales channels may include online travel agencies and validating carriers selling tickets for travel services to be provided by an operating carrier. The indirect sellers may receive payment from the travelers for the booked tickets, and then compensate the operating carrier for the cost of the travel service provided.

The processing and database system may include a database containing data relating to prior transactions made by one or more of the indirect sellers, a database of carrier specific business rules for handling transactions, and an auditing module that interacts with a pricing engine and each of the databases to determine a business rule having a best match to the transaction. In response to receiving a request to issue a ticket, the auditing module may determine if the pending transaction violates any pricing rules of the validating carrier. The determination of whether the transaction is properly priced may be made while the transaction is pending, or may be made in response to a request by the indirect seller to check the pricing prior to booking a ticket. If the transaction is not priced properly, the auditing module may access a database of business rules that includes business rules specific to the validating carrier. The business rules that are relevant to the transaction being evaluated may vary depending on a classification of the transaction.

In cases where more than one business rule is relevant to the transaction, the auditing module may access the database of historical information to retrieve data relating to previous transactions that were improperly priced. This data may in turn be used to determine which of the relevant business rules should be applied to the pending transaction. The auditing module may then apply the selected business rule to: reject the transaction; warn the seller that the transaction was improperly priced, thereby allowing the seller to take corrective action; allow the ticket to issue and set a flag in an accounting system of the validating carrier notifying the validating carrier that an ADM should be issued; or ignore the improper pricing and allow the ticket issue without taking any additional action. The auditing module may also enable the indirect seller to verify that modifications to a priced ticket comply with the pricing rules of the validating carrier prior to requesting issuance of a ticket.

Figure 1:
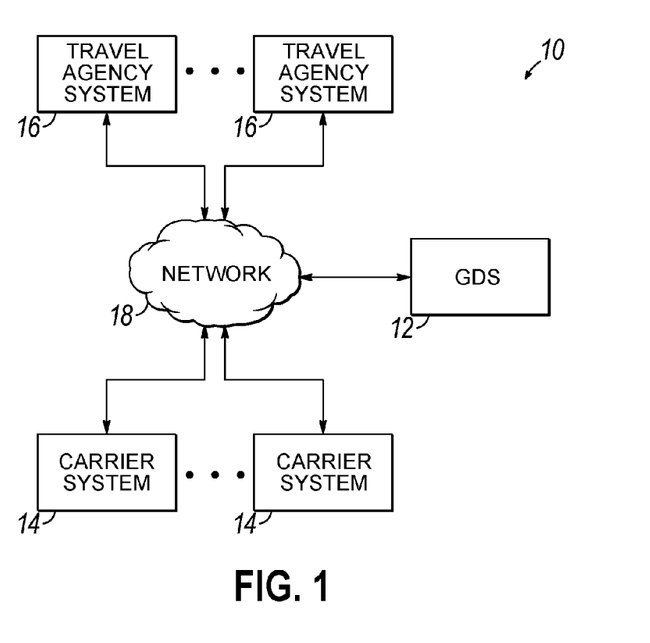
FIG. 1 is a diagrammatic view of an exemplary operating environment including a plurality of computer systems in communication via a network.

Referring now to FIG. 1, an operating environment 10 in accordance with an embodiment of the invention may include a Global Distribution System (GDS) 12, one or more carrier systems 14, and one or more travel agency systems 16 in communication via a network 18. The carrier systems 14 may each include a Computer Reservation System (CRS) or other billing system for the respective carrier that enables the GDS 12 or travel agency systems 16 to reserve and pay for airline tickets. The carrier systems 14 may also interact with each other, either directly or through the GDS 12, to enable a validating carrier to sell tickets for seats provided by the operating carrier. The operating carrier may then bill the validating carrier for the services provided. In some instances, the validating carrier may provide the service, in which case the validating carrier would also be the operating carrier. The network 18 may comprise one or more private or public networks (e.g., the Internet) that enable the exchange of data.

The GDS 12 may be configured to facilitate communication between the carrier systems 14 and travel agency systems 16 by enabling travel agents, validating carriers, or other indirect sellers to book reservations on one or more carrier systems 14 via the GDS 12. To this end, the GDS 12 may maintain links to each of the carrier systems 14 via the network 18. These links may allow the GDS 12 to route reservation and booking requests from the carrier systems 14 of the validating carrier or the travel agency systems 16 to the corresponding carrier systems 14 of the operating carrier. The carrier systems 14 and travel agency systems 16 may thereby book flights on multiple airlines via a single connection to the GDS 12.

Figure 2:
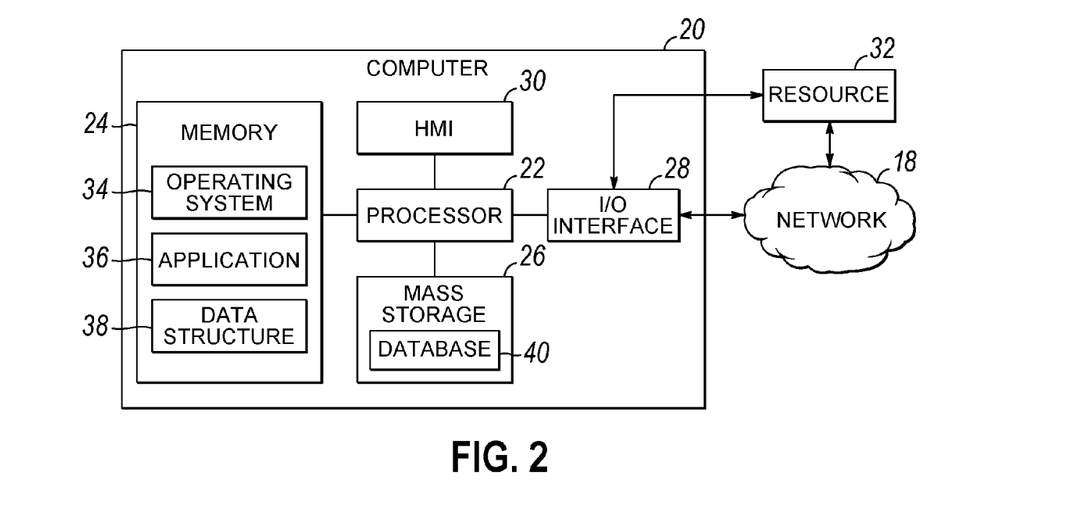
FIG. 2 is a diagrammatic view of an exemplary computer system of FIG. 1.

Referring now to FIG. 2, the GDS 12, carrier systems 14, and travel agency systems 16 of operating environment 10 may be implemented on one or more computing devices or systems, such as exemplary computer 20. The computer 20 may include a processor 22, a memory 24, a mass storage memory device 26, an input/output (I/O) interface 28, and a Human Machine Interface (HMI) 30. The computer 20 may also be operatively coupled to one or more external resources 32 via the network 18 or I/O interface 28. External resources may include, but are not limited to, computers, servers, databases, mass storage devices, peripheral devices, cloud-based network services, or any other suitable computer resource that may be used by the computer 20.

The processor 22 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 24. Memory 24 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 26 may include data storage devices such as a hard drive, optical drive, tape drive, non-volatile solid state device, or any other device capable of storing information.

Processor 22 may operate under the control of an operating system 34 that resides in memory 24. The operating system 34 may manage computer resources so that computer program code embodied as one or more computer software applications, such as an application 36 residing in memory 24, may have instructions executed by the processor 22. In an alternative embodiment, the processor 22 may execute the application 36 directly, in which case the operating system 34 may be omitted. One or more data structures 38 may also reside in memory 24, and may be used by the processor 22, operating system 34, or application 36 to store or manipulate data.

The I/O interface 28 may provide a machine interface that operatively couples the processor 22 to other devices and systems, such as the network 18 or external resource 32. The application 36 may thereby work cooperatively with the network 18 or external resource 32 by communicating via the I/O interface 28 to provide the various features, functions, applications, processes, or modules comprising embodiments of the invention. The application 36 may also have program code that is executed by one or more external resources 32, or otherwise rely on functions or signals provided by other system or network components external to the computer 20. Indeed, given the nearly endless hardware and software configurations possible, persons having ordinary skill in the art will understand that embodiments of the invention may include applications that are located externally to the computer 20, distributed among multiple computers or other external resources, or provided by computing resources (hardware and software) that are provided as a service over the network 18, such as a cloud computing service.

The HMI 30 may be operatively coupled to the processor 22 of computer 20 in a known manner to allow a user to interact directly with the computer 20. The HMI 30 may include video or alphanumeric displays, a touch screen, a speaker, and any other suitable audio and visual indicators capable of providing data to the user. The HMI 30 may also include input devices and controls such as an alphanumeric keyboard, a pointing device, keypads, pushbuttons, control knobs, microphones, etc., capable of accepting commands or input from the user and transmitting the entered input to the processor 22.

A database 40 may reside on the mass storage memory device 26, and may be used to collect and organize data used by the various systems and modules described herein. The database 40 may include data and supporting data structures that store and organize the data. In particular, the database 40 may be arranged with any database organization or structure including, but not limited to, a relational database, a hierarchical database, a network database, or combinations thereof. A database management system may be provided by a computer software application executing as instructions on the processor 22. This database management system may be used to access the information or data stored in database records in response to a query. The query may be dynamically determined and executed by the operating system 34, other applications 36, or one or more modules.

Figure 3:
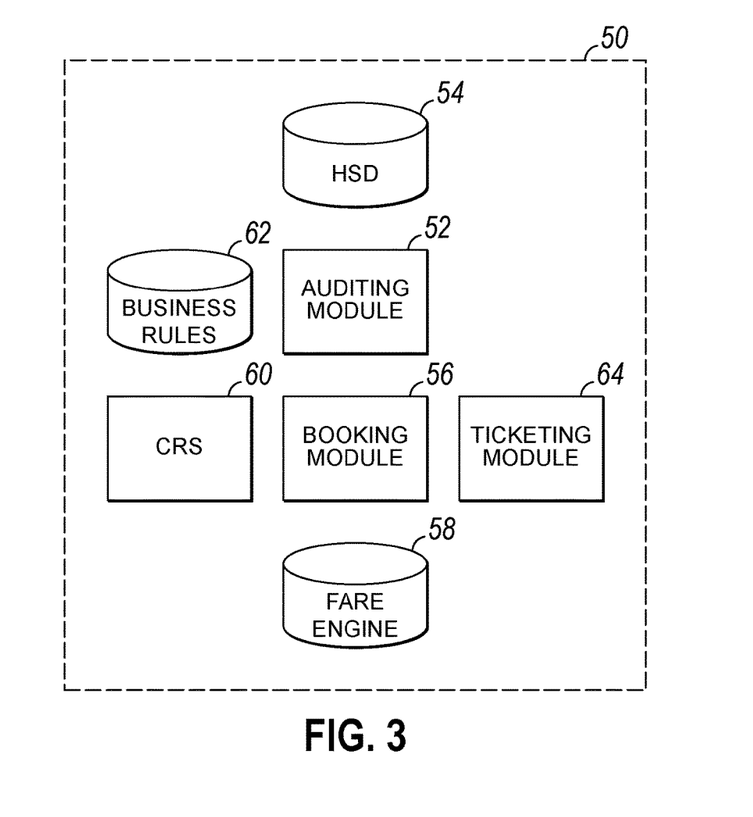
FIG. 3 is a diagrammatic view of a block diagram depicting an operating environment including an auditing module, a Historical Sale Deviation (HSD) database, and a business rules database that may be provided by one or more of the computer systems in FIG. 1.

Referring now to FIG. 3, an exemplary operating environment 50 in accordance with an embodiment of the invention may include an auditing module 52, a Historical Sale Deviation (HSD) database 54, a booking module 56, a fare engine 58, a CRS 60, a business rules database 62, and a ticketing module 64, each of which may be provided by a suitable computing system. For example, the auditing module 52, HSD database 54, booking module 56, and fare engine 58 may be provided by the GDS 12, the CRS 60 and business rules database 62 may be provided by one of the carrier systems 14, and the ticketing module 64 may be provided by one of the travel agency systems 16.

Purchasing an airline ticket or other travel service may involve pricing, booking, and ticketing the travel service. For example, once the traveler is satisfied with an itinerary, the travel agent may price one or more tickets comprising the itinerary by interacting with a user interface provided by the ticketing module 64. In response to this interaction, the ticketing module 64 may send a pricing request to the fare engine 58, which in turn determines prices for the one or more tickets and replies to the ticketing module 64.

The travel agent may allow a ticket to price automatically based on a price received from the fare engine 58. The travel agent may also manually enter the price for the ticket, which may allow the travel agent to adjust the price from the price returned by the fare engine 58. In either case, the travel agent may book the ticket by causing the ticketing module 64 to send a booking request to the booking module 56. The booking module 56 may then communicate with the CRS 60 to determine the availability of one or more flights identified in the booking request. If a seat is available for the requested flights, the booking module 56 may book the flight, and the CRS 60 may decrease the corresponding operating carrier's inventory to reflect the booking. The booking module 56 may then transmit a booking confirmation to the ticketing module 64, which may in turn issue a ticket to the traveler. The traveler's account (e.g., credit card) may be billed upon issuance of the ticket.

During the transaction, the auditing module 52 may receive data defining one or more characteristics of the transaction, such as a quoted price $P_Q$ for the ticket, and an audit amount representing the correct price $P_C$ that should be charged for the ticket. This data may be received directly from the booking module 56 or fare engine 58. The data may also be received by the auditing module 52 monitoring communications between the GDS 12, carrier systems 14, and travel agency system 16. The pricing for the ticket may be determined, for example, in response to the booking module 56 receiving the booking request. The correct price $P_C$ may be based on data relating to the ticket, such as a booking code, a class of service, an origination-destination city pair, a date of travel, or any other suitable data that characterizes the ticket. This data may be used to determine if fare tariffs, pricing rules, routing maps, class of service tables, tax information, etc., were properly implemented by the indirect seller to determine quoted price $P_Q$ for the ticket. Pricing rules may include booking conditions such as minimum stay or advance purchase, and may be specific to a city pair or a class of service.

Figure 4:
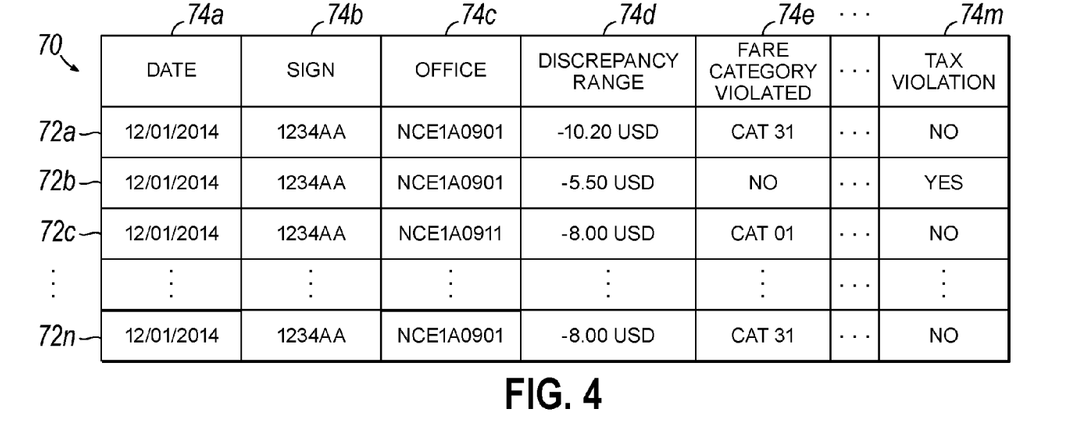
FIG. 4 is a diagrammatic view of a transaction table that may be maintained by the HSD database of FIG. 3.

Referring now to FIG. 4, the HSD database 54 may be configured to maintain a plurality of prior transactions in one or more transaction tables, such as exemplary transaction table 70. Transaction table 70 may include a plurality of rows each representing a fraudulent transaction 72a-72n. Fraudulent transactions may include previous transactions that violated one or more pricing rules of the validating carrier. The transaction table 70 may also include a plurality of columns each defining a transaction characteristic 74a-74m associated with the fraudulent transaction 72a-72n. The transaction characteristics 74a-74m may include, for example, a time or date of the transaction 74a, an identity of the agent that originated the transaction 74b, an identity of the office where the transaction originated 74c, a discrepancy V associated with the transaction 74d, a fare category violated 74e, and whether there was a tax violation 74m.

Each fraudulent transaction 72a-72n may represent a transaction in which a ticket was allowed to issue despite the presence of a pricing rule violation or other fraudulent activity. The transaction table 70 may be organized into two parts: an indirect seller profile that includes, for example, the identity of the travel agent, the identity of the ticketing office, and the date of the transaction; and data describing the fraud, such as a source of the discrepancy V (e.g., penalty, improperly priced fare, failure to add taxes, incorrect commission, etc.), an amount or range of the discrepancy V, an actual amount collected, a theoretical amount collected, the fare category violated (cat 31, etc.), whether there was a tax violation, a type of transaction (issuance, refund, reissuance, etc.), or any other suitable data.

The HSD database 54 may be configured to purge stale data from the database. For example, the HSD database 54 may delete fraudulent transactions 72a-72n from the transaction table 70 if the transactions are over a certain age (e.g., transactions having a date more than a year old). The HSD database 54 may also determine one or more fraud statistics based on the transaction characteristics 74a-74m from a plurality of the fraudulent transactions 72a-72n. For example, the HSD database may determine: a frequency of fraud; a most violated rule for one or more of fare category, transaction type, or tax violation; and a cumulative discrepancy. The frequency of fraud may equal a number of fraudulent transactions stored in the HSD database 54 having a date falling within a defined check period and a discrepancy V that exceeds a defined discrepancy range. The cumulative discrepancy may equal a sum of all discrepancies V in the defined check period for a defined combination of transaction characteristics 74a-74m, or transaction classification. These statistics may be determined as needed, pre-determined and stored in memory, or dynamically determined and stored in a cache.

Figure 5:
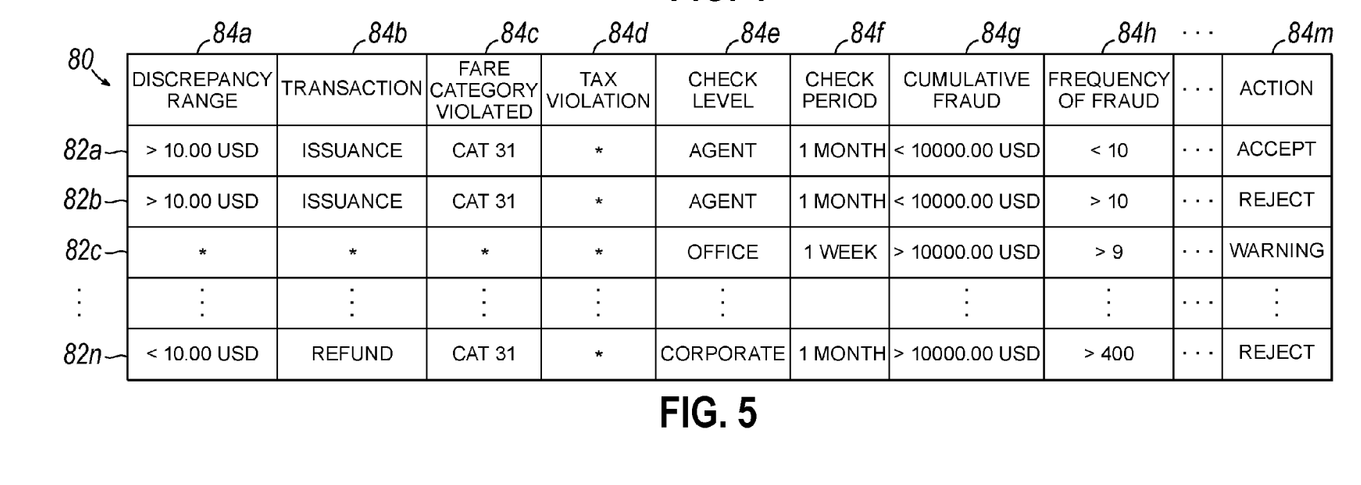
FIG. 5 is a diagrammatic view of a business rules table that may be maintained by the business rules database of FIG. 3.

Referring now to FIG. 5, the business rules database 62 may comprise one or more business rule tables such as exemplary business rule table 80. Business rule table 80 may include a plurality of rows each defining a business rule 82a-82n, and a plurality of columns each representing a rule parameter 84a-84m. Exemplary rule parameters may include a discrepancy range 84a (e.g., V≥$10), a type of transaction 84b (e.g., first issuance, refund, reissuance), a fare category violated 84c (e.g., cat 31—voluntary changes), a tax violation indicator 84d (e.g., Yes or No), a check level 84e that provides a user level for which discrepancies are to be checked and accumulated (e.g., agent, corporate, or office), a check period 84f that defines a time period over which discrepancies are to be checked and accumulated, (e.g., previous month, previous week), a cumulative fraud range 84g, a frequency of fraud 84h that defines a number or range of incidents of fraud during the check period (e.g., the number of transactions for which the discrepancy V exceeded discrepancy range 84a), and an action to be taken 84m if the business rule 82a-82n is enforced.

If a particular parameter is not considered, or ignored, in determining the applicability of the business rule, the corresponding table entry may include a symbol that indicates this (e.g., *). The business rule parameters 84a-84m may be defined by the validating carrier, and may include other parameters not shown in business rule table 80, such as the source of the discrepancy (e.g., a penalty fee, tax, incorrect fare, etc.), an actual amount collected by the travel agent, a theoretical amount collected by the travel agent, or any other suitable business rule parameter. By allowing each carrier to define and manage their own business rules database 62, each carrier may define a set of business rules specific to their business needs. Embodiments of the invention thereby enable carriers to define their own business rules and actions for treating a pending transaction based on fraud and history.

Business rule parameters may be classified as transaction criteria, HSD criteria, HSD results, or decisions. The transaction criteria may include parameters relating to individual transactions, such as the discrepancy range 84a, type of transaction 84b, fare category violated 84c, tax violation indicator 84d, date (not shown), agent identity (not shown), office identity (not shown), or any other business rule parameter associated with the transaction itself. The HSD criteria may include the transaction criteria as well as the check level 84e and check period 84f parameters. HSD results may include the cumulative fraud, frequency of fraud, or any other results determined by applying the transaction criteria to the transaction characteristics stored in the HSD database 54. Decisions may include actions to be taken 84m in response to applying the business rule 82a-82n to the pending transaction.

In response to receiving a request to issue a ticket, the auditing module 52 may query the business rules database 62. The query may include information related to the pending transaction, such as a result of an audit of the transaction. In response to the query, the business rules database 62 may return one or more relevant business rules. For each of the relevant business rules, the auditing module 52 may then query the HSD database 54 for HSD criteria matching the relevant business rule. The auditing module 52 or HSD database 54 may then determine the cumulative amount and frequency of fraud based on the transactions satisfying the HSD criteria of the relevant business rule being evaluated. The auditing module may then re-apply HSD results as new criteria to determine which of the relevant business rules should be applied to the transaction and take the corresponding action. If transaction is accepted, the auditing module 52 may update the HSD database 54 with new transaction data.

Figure 6:
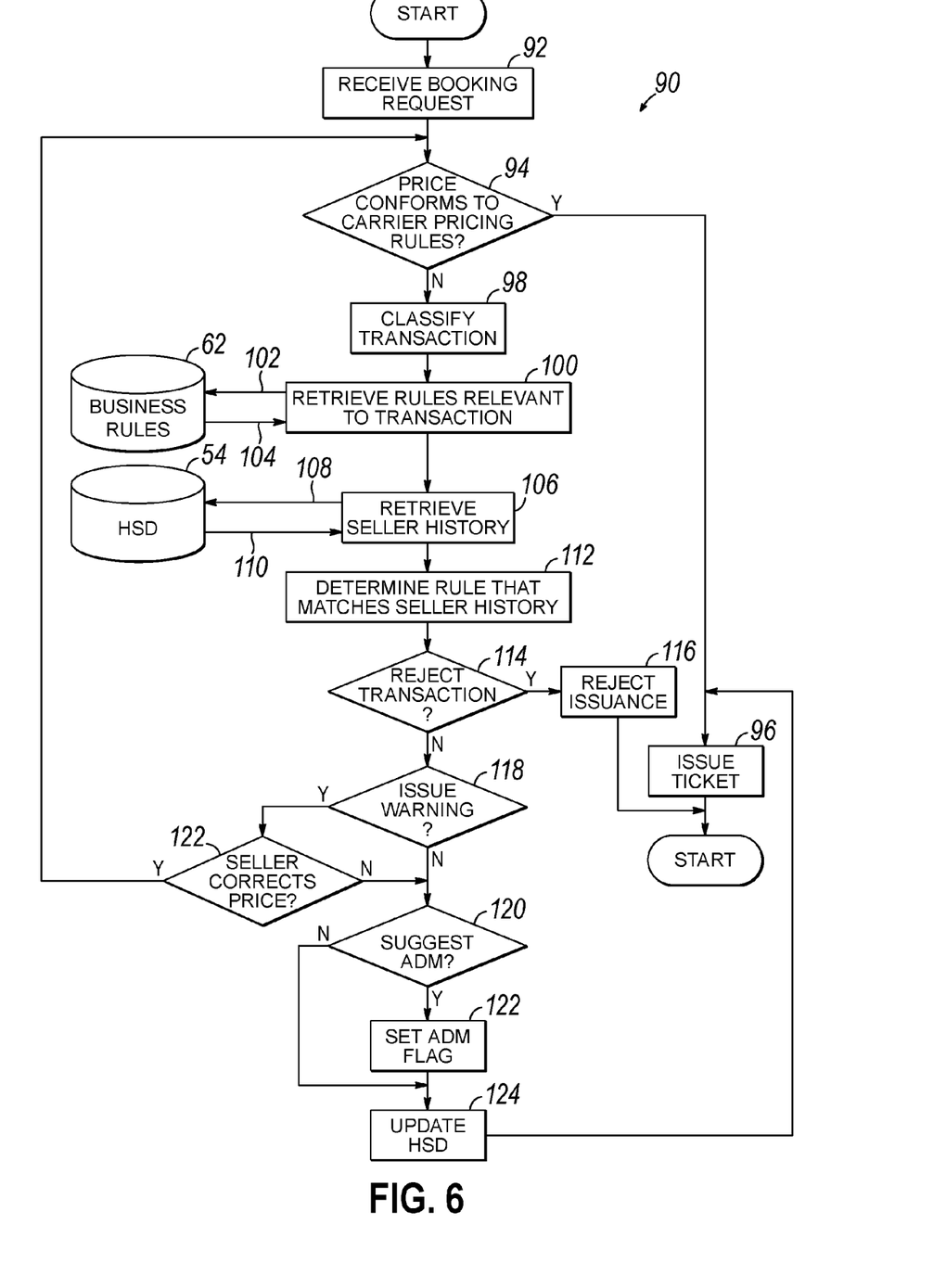
FIG. 6 is a flow chart depicting a process that may be executed by the auditing module of FIG. 3 to implement embodiments of the invention.

Referring now to FIG. 6, a flow chart is presented that depicts a process 90 that may be performed by the auditing module 52 in accordance with an embodiment of the invention. In block 92, the process 90 may receive a request to book a travel service, such as a flight. In response to receiving the request, the process 90 may proceed to decision block 94 and determine if the quoted price $P_Q$ for the ticket conforms to the pricing rules of the validating carrier. This determination may be based on whether the quoted price $P_Q$ matches the correct price $P_C$. Pricing rules may be identified by a fare basis code, and may depend on the characteristics of the transaction, such as booking class, one or more fare categories defining ticket purchasing requirements (e.g., advanced purchase required, refundable, non-refundable, web-only fare, etc.), stay requirements, round-trip requirements, flight origination requirements, connection requirements, seasonal requirements, day of the week requirements, flight restrictions, or any other rule or carrier policy that must be satisfied to qualify for the fare. There may be a plurality of fare bases that can be used in each market, with each fare basis covering a plurality of possible fares. Pricing rules may also vary between carriers.

If the quoted price $P_Q$ conforms to the carrier pricing rules, ("YES" branch of decision block 94), the process 90 may proceed to block 96 and allow the ticket to issue without further action. If the quoted price $P_Q$ does not conform to the carrier pricing rules ("NO" branch of decision block 94), the process 90 may proceed to block 98. In an embodiment of the invention, the quoted price $P_Q$ may be considered to match the correct price $P_C$ so long as a discrepancy $V=P_Q-P_C$ is greater than or equal to a predetermined minimum threshold (e.g., V≥0).

In block 98, the process 90 may classify the pending transaction. The classification may be based on, for example, whether a specified set of transaction characteristics match a specified set of the business rule parameters 84a-84m. In an embodiment of the invention, the classification may be defined by the value of the discrepancy range 84a, the type of transaction 84b, the fare category violated 84c, and the tax violation indicator 84d. Persons having ordinary skill in the art will recognize that other transaction characteristics could be used to classify the pending transaction, and that embodiments of the invention are not limited to classifying the pending transaction based on any specific set of transaction characteristics. In response to classifying the pending transaction, the process 90 may proceed to block 100.

In block 100, the process 90 may retrieve rules relevant to the pending transaction based on the classification. To this end, the process 90 may transmit a query 102 to the business rules database 62 of the validating carrier. The query 102 may request that the business rules database 62 identify business rules relevant to the classification of the pending transaction. In response to receiving the query, the business rules database 62 may select business rules matching the classification from the plurality of business rules 82a-82n. That is, the business rules database 62 may select each business rule 82a-82n having parameters (e.g., 84a-84d) that match the characteristics used to classify the pending transaction (e.g., the discrepancy range, type of transaction, fare category violated, or presence of a tax violation). The business rules database 62 may then transmit a response 104 including the relevant business rules to the process 90. The process 90 may then proceed to block 106.

In block 106, the process 90 may retrieve seller history data from the HSD database 54 by transmitting one or more queries 108 to the HSD database 54. The queries 108 may define search criteria that cause the HSD database 54 to filter database search results so that only fraudulent transactions satisfying the search criteria are considered. The search criteria may thereby define a set of transactions comprising one or more of the fraudulent transactions stored in the HSD database 54 that are relevant to at least one of the business rules retrieved from the business rules database 62. For example, the one or more queries 108 may request that the HSD database 54 return data for all fraudulent transactions relating to the office originating the pending transaction, only data for fraudulent transactions involving the agent originating the pending transaction, or only data involving a particular corporate entity. The search criteria may be defined by the business rules being applied, and may include the check level (e.g., travel agency, ticketing office, travel agent, or corporate entity) and the check period (e.g., prior month) for which data is to be returned. The output of the HSD database 54 may thereby be configurable so that the data contains data relevant to the validating carrier. Examples of data returned by the HSD database 54 may include cumulative fraud and frequency of fraud in the check period defined by the business rule triggering the one or more queries 108.

In an embodiment of the invention, the process 90 may transmit a query 108 for each business rule returned in block 100. In response to receiving the queries 108, the HSD database 54 may determine all the fraudulent transactions 72a-72n matching the business rule 82a-82n identified by each query 108. For example, the business rule may define a discrepancy range ">$10", a transaction type of "issuance", a fare category of "CAT 31", a check level of "agent", and a check period of "1 month". In response to receiving this exemplary business rule, the HSD database 54 may return all ticket issuances during the last month having a discrepancy >$10 and a CAT 31 violation for the agent who originated the pending transaction. The HSD database 54 may provide this data by transmitting a response 110 to the process 90 that includes the matching transactions, or data determined from the matching transactions. The HSD database 54 may also filter the data based on the identity of the validating carrier so that only fraudulent transactions for the validating airline are considered by the process 90.

In response to receiving the fraudulent transaction data from the HSD database 54, the process 90 may proceed to block 112 and apply the fraudulent transaction data as new criteria to identify a single business rule to apply to the pending transaction. To this end, the process 90 may remove business rules received in block 100 having parameters which fail to match the seller data. For example, the process 90 may determine a fraud metric for each business rule based on the fraudulent transaction data retrieved for the corresponding business. The fraud metric may comprise, for example, one or both of the cumulative fraud and frequency of fraud for the business rule being evaluated. These determinations may be made in the HSD database 54 and transmitted to the auditing module 52, or may be determined by the auditing module 52 based on the data received from the HSD database 54. If the determined cumulative fraud or frequency of fraud does not match the corresponding parameters of the business rule, the business rule may be removed from consideration by the process 90.

If, after applying the fraudulent transaction data, there is more than one business rule that matches the possible fraud, the process 90 may select the business rule having a "best match". The best match may be determined based on: which business rule parameters 84a-84m are considered by the business rule, and a restrictiveness of the business rule. To this end, the process 90 may assign a weight to each parameter of the rules being evaluated, and determine a best match score for each business rule by summing the weight of each parameter considered by the rule. The weights may be defined based on a relevance of the parameters to reducing fraud, and to avoid generating the same weighted score for two separate business rules 82a-82n.

For example, it may be determined that the discrepancy range 84a is more relevant to determining if the transaction should be accepted than the frequency of fraud 84h, and that the frequency of fraud 84h is more relevant than the fare category violated 84c. Under this exemplary scenario, the discrepancy range 84a may be assigned a weight having a relatively high value (e.g., 4), the frequency of fraud 84h may be assigned a weight having a medium value (e.g., 2); and the transaction 84b may be assigned a weight having a relatively low value (e.g., 1). Business rules that match the fraud and consider each of these three parameters would receive a weighted score of 4+2+1=7. In contrast, business rules that match the fraud, but only consider the first two parameters (discrepancy range 84a and frequency of fraud 84h are considered, type of transaction 84b is ignored), would have a weighted score of 4+2=6.

If two or more business rules have the same best match score, the process 90 may further narrow the results to a single business rule by selecting the most restrictive of the remaining business rules. To this end, the process 90 may, beginning with the highest weighted parameter and working downward, compare the remaining business rules based on the value of the individual parameters. Returning to the above example, the process 90 may compare the discrepancy range 84a of each of the remaining business rules. If one business rule has a discrepancy range that is more restrictive (e.g., the business rule requires a higher value of V) than any of the other remaining business rules, that business rule may be selected for evaluating the received booking request. Other examples of restrictiveness include check level 84e of "agent" as compared to "office", which may include several agents. Thus, one parameter may be considered more restrictive than another parameter due to the more restrictive parameter applying to fewer transactions.

If, after comparing the higher weighted parameter (e.g., the discrepancy range 84a), two or more business rules are still tied, the process 90 may compare the next most highly weighted parameter (e.g., frequency of fraud 84h) for the remaining rules. In this way, the process 90 may sequentially eliminate business rules until one business rule is selected that provides a best match to the seller history. The process 90 may then proceed to decision block 114 and begin the process of determining how to the treat the pending transaction.

In decision block 114, the process 90 may determine if the action parameter 84m of the selected business rule is "reject". If the action parameter 84m is "reject", the process 90 may reject the transaction ("YES" branch of decision block 114) and proceed to block 116. In block 116, the process 90 may cause the booking module 56 to reject issuance of the proposed transaction, in which case the validating carrier will not issue the ticket for the travel service. If the action parameter 84m of the selected business rule is not "reject" ("NO" branch of decision block 114), the process 90 may proceed to decision block 118.

In decision block 118, the process 90 may determine whether to issue a warning to the travel agent. If the action parameter 84m of the selected business rule is not "warning" ("NO" branch of decision block 118), the process 90 may proceed to decision block 120 without issuing the warning. If the action parameter 84m of the selected business rule is "warning" ("YES" branch of decision block 118), the process 90 may issue the warning to the travel agent and proceed to block 122. In response to the process 90 issuing the warning, a warning may be displayed on the user interface of the ticketing module 64, and may indicate that the quoted price $P_Q$ is wrong. The warning may also provide an indication to the travel agent of why the quoted price $P_Q$ is wrong. The travel agent may then decide whether to correct the quoted price $P_Q$, or confirm the issuance knowing that the quoted price $P_Q$ is incorrect, and an ADM may be received as a result.

In block 122, the process 90 may determine if the travel agent corrects the quoted price $P_Q$ in response to receiving the warning. If the travel agent corrects the quoted price $P_Q$ ("YES" branch of decision block 120), the process 90 may return to decision block 94 and determine if the corrected price conforms to the carrier pricing rules. If the travel agent confirms the issuance without correcting the quoted price $P_Q$ ("NO" branch of decision block 120), the process 90 may proceed to decision block 120.

In decision block 120, the process 90 may determine if an ADM should be suggested to the validating carrier. If the process 90 determines that the ADM should be suggested ("YES" branch of decision block 120), the process 90 may proceed to block 122 and set an ADM flag in the accounting system of the validating carrier before proceeding to block 124. The process 90 may set the ADM flag, for example, by causing the GDS 12 to transmit a message to the carrier system 14 of the validating carrier. The ADM flag may cause the accounting system to notify an operator that an ADM should be generated in response to receiving a settlement for the pending transaction. If the process 90 determines that the ADM should not be suggested ("NO" branch of decision block 120), the process 90 may proceed to block 124.

In block 124, the process 90 may update the HSD database 54 before proceeding to block 96 and allowing the ticket to issue. Updating the HSD database 54 may comprise, for example, transmitting a message from the auditing module 52 to the HSD database 54 that causes the HSD database 54 to add a fraudulent transaction 72a-72n to the transaction table 70 that includes transaction characteristics 74a-74m for the pending transaction. In this way, the process 90 may update the HSD database 54 each time a ticket having a discrepancy V is allowed to issue.

In cases where the travel agent has modified a transaction stored ticket, has manually priced the ticket, or is refunding the ticket, the travel agent may wish to determine if the quoted price $P_Q$ for the ticket conforms with the pricing rules of the validating carrier before submitting the transaction. To facilitate price checking prior to submitting the transaction, embodiments of the invention may include a price checking feature. The price checking feature may cause the ticketing module 64 to provide a price check button or other suitable object on a user interface of the ticketing module 64. The price check button may enable the travel agent to initiate a price check by activating the price check button. In response to the price check button being activated, the auditing module 52 may access the fare engine 58 and determine if the quoted price $P_Q$ for the ticket conforms to the pricing rules of the validating carrier. The auditing module 52 may then cause the ticketing module 64 to display a message indicating the results of the price check. Embodiments of the invention may thereby allow the travel agent to perform a price check any time prior to requesting an issuance, refund, or any other suitable transaction. The system will then provide a warning to the travel agent if the proposed price violates the pricing rules of the validating carrier, thereby enabling the travel agent to correct the transaction and avoid receiving an ADM.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of auditing a transaction, the method comprising:
    receiving, at a processor, data characterizing the transaction, the data including a first price for a travel service to be provided by a service provider;
    determining, by the processor, a second price for the travel service based on a pricing rule of the service provider;
    determining, by the processor, if the first price matches the second price;
    in response to the first price matching the second price, allowing, by the processor, the transaction;
    in response to the first price not matching the second price, determining, by the processor, at least one source of the discrepancy;
    determining, by the processor, at least one weighted discrepancy parameter for the at least one source of the discrepancy;
    determining, by the processor, at least one action parameter based on the at least one source of the discrepancy, the at least one weighted discrepancy parameter, and a set of transactions that occurred prior to the transaction; and
    determining, by the processor, an action based on the action parameter.

2. The method of claim 1 wherein determining the at least one weighted discrepancy parameter includes determining a fraud metric based on the set of transactions, determining the at least one action parameter includes determining a business rule that matches the fraud metric, and the at least one action parameter is based on the business rule.

3. The method of claim 2 wherein the at least one action parameter is allowing the transaction, allowing the transaction and displaying a warning message to a seller of the travel service, allowing the transaction and suggesting an Agency Debit Memo, or rejecting the transaction.

4. The method of claim 2 further comprising:
    transmitting a request for the fraud metric to a database including the set of transactions;
    determining the fraud metric at the database based on the set of transactions; and
    receiving the fraud metric from the database.

5. The method of claim 2 wherein the set of transactions comprises a plurality of prior transactions, and the fraud metric is a frequency of fraud, a cumulative discrepancy, or a most violated rule of the plurality of prior transactions.

6. The method of claim 5 wherein the set of transactions is defined by an identity of a seller of the travel service, an identity of an office associated with the transaction, a check period during which the set of transactions was conducted, or a combination thereof.

7. The method of claim 1 wherein the set of transactions is stored in a database, and further comprising:
    updating the database by adding the transaction to the set of transactions.

8. The method of claim 7 wherein the transaction is added to the set of transactions in response to the transaction being allowed.

9. The method of claim 1 wherein determining the at least one weighted discrepancy parameter includes determining a first plurality of business rules that are relevant to the transaction and determining a fraud metric for each of the first plurality of business rules based on the set of transactions, and determining the at least one action parameter includes selecting one of the first plurality of business rules based on the fraud metric of each rule and defining the at least one action parameter based on the business rule selected.

10. The method of claim 9 wherein determining the first plurality of business rules comprises:
    determining a classification of the transaction based on a characteristic of the transaction; and
    selecting the first plurality of business rules from a second plurality of business rules based on the classification.

11. The method of claim 10 wherein the characteristic used to determine the classification of the transaction comprises a value of a discrepancy between the first price and the second price, a type of the transaction, a fare category violated by the transaction, or a tax violated by the transaction.

12. The method of claim 9 wherein determining the at least one weighted discrepancy parameter includes determining a discrepancy range based on the application of a business rule to the set of transactions.

13. The method of claim 9 wherein determining the at least one weighted discrepancy parameter includes determining a fare category violated based on the application of a business rule to the set of transactions.

14. The method of claim 1 wherein the set of transactions includes a plurality of prior transactions stored in a first database, and determining the at least one action parameter comprises:
    determining a classification of the transaction based on a characteristic of the transaction;
    querying a second database for business rules relevant to the classification;
    for each business rule returned by the second database, determining a search criteria and querying the first database for a first fraud metric based on the search criteria;
    determining a match between the first fraud metric and a second fraud metric defined by each business rule; and
    determining the business rule having a best match between the first fraud metric and the second fraud metric, wherein
    the at least one action parameter is defined by the business rule having the best match.

15. An apparatus for auditing a transaction, the apparatus comprising:
    a processor; and
    a memory including program code that, when executed by the processor, causes the apparatus to:
    receive data characterizing the transaction, the data including a first price for a travel service to be provided by a service provider;
    determine a second price for the travel service based on a pricing rule of the service provider;
    determine if the first price matches the second price;
    in response to the first price matching the second price, allow the transaction;
    in response to the first price not matching the second price, determine at least one source of the discrepancy;
    determine at least one weighted discrepancy parameter for the at least one source of the discrepancy;
    determine at least one action parameter based on the at least one source of the discrepancy, the at least one weighted discrepancy parameter, and a set of transactions that occurred prior to the transaction; and
    determine an action based on the action parameter.

16. The apparatus of claim 15 wherein the program code further causes the apparatus to determine the at least one weighted discrepancy parameter by determining a fraud metric based on the set of transactions, determine the at least one action parameter by determining a business rule that matches the fraud metric, and determine the at least one action parameter based on the business rule.

17. The apparatus of claim 16 wherein the program code further causes the apparatus to: transmit a request for the fraud metric to a database including the set of transactions; determine the fraud metric at the database based on the set of transactions; and receive the fraud metric from the database.

18. The apparatus of claim 15 wherein the program code further causes the apparatus to: update the database by adding the transaction to the set of transactions.

19. The apparatus of claim 15 wherein the program code further causes the apparatus to:
    determine the at least one weighted discrepancy parameter by determining a first plurality of business rules that are relevant to the transaction and determining a fraud metric for each of the first plurality of business rules based on the set of transactions; and
    determine the at least one action parameter by selecting one of the first plurality of business rules based on the fraud metric of each rule and defining the at least one action parameter based on the business rule selected.

20. The apparatus of claim 19 wherein the program code further causes the apparatus to:
    determine a classification of the transaction based on a characteristic of the transaction; and
    select the first plurality of business rules from a second plurality of business rules based on the classification.

21. The apparatus of claim 19 wherein the program code further causes the apparatus to:
    determine the at least one weighted discrepancy parameter by determining a discrepancy range for each of the first plurality of business rules based on the set of transactions.

22. The apparatus of claim 19 wherein the program code further causes the apparatus to:
    determine the at least one weighted discrepancy parameter by determining a fare category violated for each of the first plurality of business rules based on the set of transactions.

23. The apparatus of claim 15 wherein the set of transactions includes a plurality of prior transactions stored in a first database, and the program code further causes the apparatus to:
    determine a classification of the transaction based on a characteristic of the transaction;
    query a second database for business rules relevant to the classification;
    for each business rule returned by the second database, determine a search criteria and query the first database for a first fraud metric based on the search criteria;
    determine a match between the first fraud metric and a second fraud metric defined by each business rule; and
    determine the business rule having a best match between the first fraud metric and the second fraud metric, wherein
    the at least one action parameter is defined by the business rule having the best match.

24. A computer program product comprising:
    a non-transitory computer-readable storage medium; and
    program code stored on the non-transitory computer-readable storage medium that, when executed by a processor, causes the processor to:
    receive data characterizing the transaction, the data including a first price for a travel service to be provided by a service provider;
    determine a second price for the travel service based on a pricing rule of the service provider;
    determine if the first price matches the second price;
    in response to the first price matching the second price, allow the transaction;

in response to the first price not matching the second price, determine at least one source of the discrepancy;
determine at least one weighted discrepancy parameter for the at least one source of the discrepancy;
determine at least one action parameter based on the at least one source of the discrepancy, the at least one weighted discrepancy parameter, and a set of transactions that occurred prior to the transaction; and
determine an action based on the action parameter.

* * * * *